Figure 1:
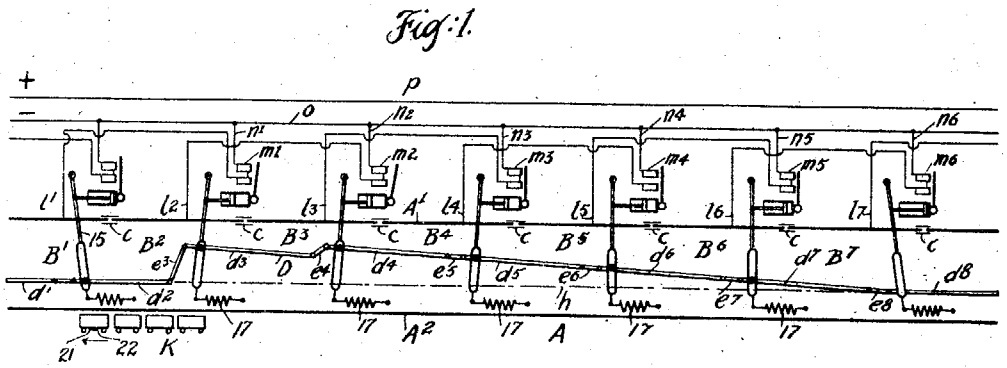

H. C. FORD.

RAILROAD SYSTEM.

APPLICATION FILED OCT. 12, 1916.

Reissued May 1, 1917.

14,295.

3 SHEETS—SHEET 1.

Hannibal C. Ford INVENTOR

BY Edwards, Sager & Wooster ATTORNEYS.

H. C. FORD.
RAILROAD SYSTEM.
APPLICATION FILED OCT. 12, 1916.
Reissued May 1, 1917.
14,295.
3 SHEETS—SHEET 2.
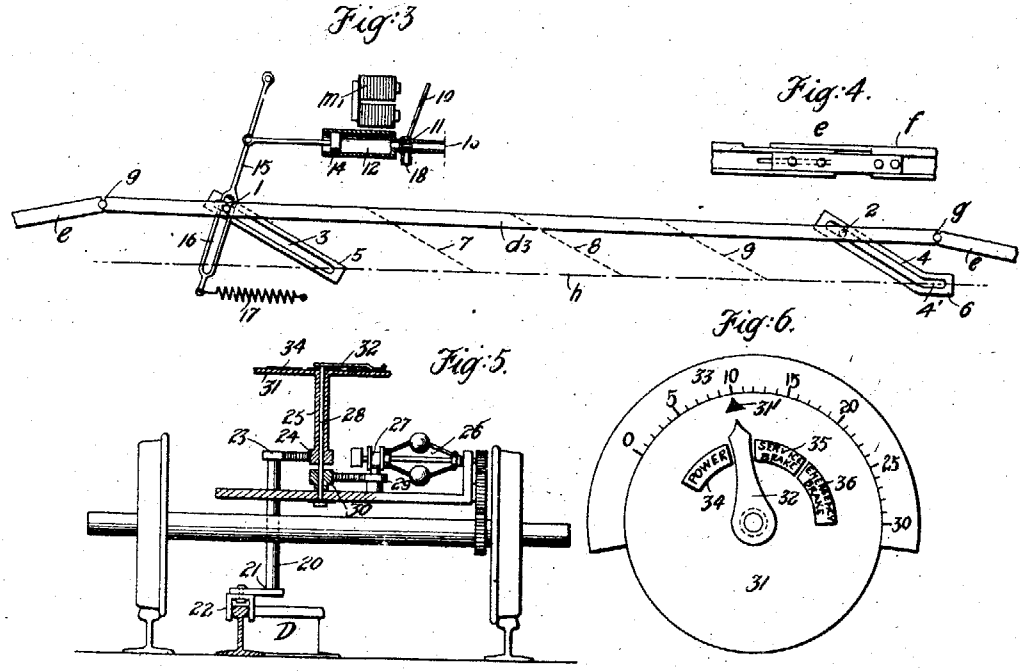
Hannibal C. Ford INVENTOR
BY Edwards, Sager & Worcester ATTORNEYS.

H. C. FORD.

RAILROAD SYSTEM.

APPLICATION FILED OCT. 12, 1916.

Reissued May 1, 1917.

14,295.

3 SHEETS—SHEET 3.

Hannibal C. Ford INVENTOR

BY Edwards, Sager & Worcester, ATTORNEYS.

UNITED STATES PATENT OFFICE.

HANNIBAL C. FORD, OF JAMAICA, NEW YORK, ASSIGNOR TO ARTHUR J. BALDWIN, OF NEW YORK, N. Y.

RAILROAD SYSTEM.

14,295. Specification of Reissued Letters Patent. Reissued May 1, 1917.

Original No. 815,086, dated March 13, 1906, Serial No. 278,183, filed September 12, 1905. Application for reissue filed October 12, 1916. Serial No. 125,331.

*To all whom it may concern:*

Be it known that I, HANNIBAL C. FORD, a citizen of the United States, residing at Jamaica, in the county of Queens and State of New York, have invented certain new and useful Improvements in Railroad Systems, of which the following is a full, clear, and exact description.

My invention relates to railway systems. The usual method of operating modern railroads is by the so-called "block-signal system", in which the track is divided into predetermined periods or blocks each having suitable signals at its entrance by which only one train at a time is admitted. An extension of the block system has been made in the "overlap" method by which certain caution signals are employed to warn an engineer, who thereafter proceeds more slowly and with caution, so that trains may approach more nearly together without danger, and thereby be run with great frequency. It is obvious, however, that these methods do not wholly eliminate the danger of collisions where trains are run at close intervals and at high speed upon a single track, and in practice collisions actually occur quite frequently. In order to wholly avoid collisions and to run trains at any approach to the frequency that conditions in crowded cities actually require, it is necessary to do two things—first, to eliminate the human element altogether, and, secondly, to provide an automatic system by which each train causes to follow behind it a zone of influence which will automatically cause a succeeding train to reduce its speed to a degree proportional to the intervening distance. By the present invention I accomplish these ends.

Other objects of the invention are to devise a method and apparatus by which the above-named objects can be carried into effect in a practicable and convenient manner and to devise a system in which the control of the trains remains within the pleasure of the engineer until the time when an approach to the danger zone of the previous train causes an automatic reduction of speed.

With these and other objects in view, my invention consists in the method and in the construction, combination, location, and arrangement of parts, all as will be more fully hereinafter set forth, as shown in the accompanying drawings, and finally particularly pointed out in the appended claims.

Figure 2:
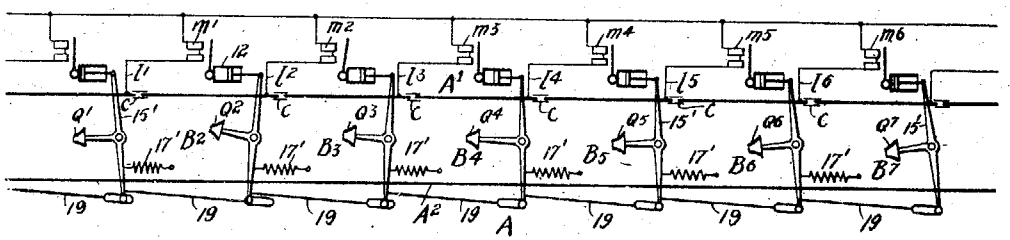
Figure 7:
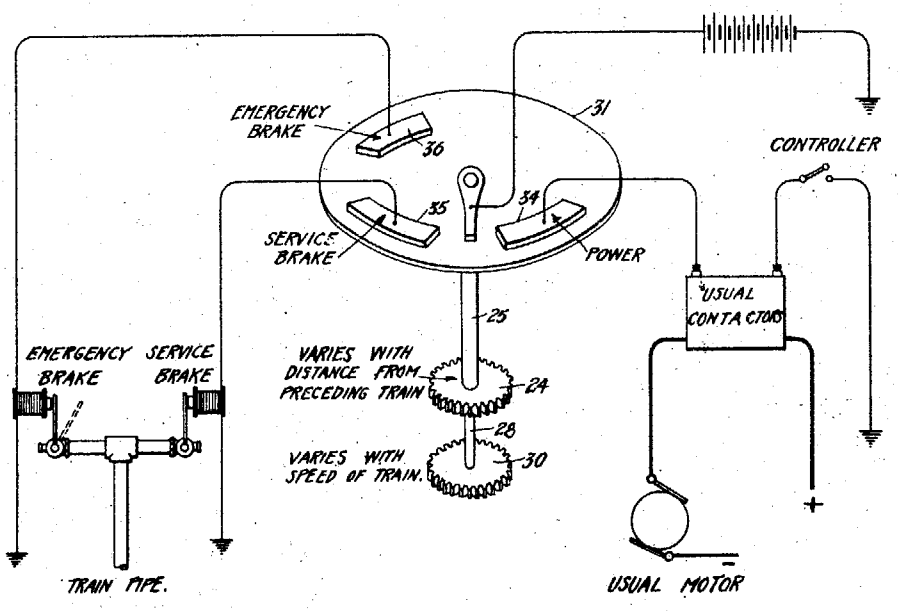

Referring to the drawings, Figure 1 is a diagrammatic view showing a railway system embodying the principles of my invention. Fig. 2 is a similar view showing a slightly modified form of system. Figs. 3 and 4 are detail views illustrating a portion of the apparatus. Fig. 5 is a view showing a form of operating parts which might be employed in connection with my railroad system. Fig. 6 is a detail view of the same. Fig. 7 is a diagrammatic view showing circuits.

In order to clearly understand the nature and scope of the present invention, it is necessary to consider the problems which arise in the operation of rapid transit trains at frequent intervals. When a train is moving on a track at a certain speed, there is a definite and ascertainable distance corresponding to the particular speed through which the train will run in coming to a stop. Since the kinetic energy of a moving body is proportional to the square of its speed, a train run at twenty miles an hour takes just four times the distance in coming to a stop that is required by a train running at ten miles an hour. A train running at forty miles an hour slides sixteen times as far in coming to a stop as the ten-mile-an-hour train, supposing the emergency brake to be applied in both cases. Therefore it will be seen that when trains run at high speeds they must be at a considerable distance apart, but that if the speed is reduced the necessary interval of space is greatly cut down. Inasmuch as speeds of twenty and thirty miles an hour are used and are in fact quite common, the block interval which is now made the standard of separation of the moving trains must be accorded to the highest speed used, which means a long space interval between trains wholly inconsistent with the transit demands. Up to the present time, so far as I am aware, it has never been proposed to have a variable and movable block interval or zone which travels along behind a train and which limits following trains to a distance which is great if their speed is high, but very low when their speed is sufficiently reduced. With such a system trains can be run as closely together as they can be placed on a track and allowed to go as fast as their propelling means will carry them—in other words, an ideally perfect arrangement in railroad systems.

Referring to the drawings, A denotes a railway comprising rails A′ and A², and in Figs. 1 and 2 I have, in order to make the illustration possible in a limited space, shown the scale very much out of proportion, the portion of the railway illustrated being one thousand to fourteen hundred feet long, to mention a practical figure. This section of railway is divided into what I shall term "units" B′, B², B³, B⁴, etc. These units do not correspond to the modern block section or to any present system, being comparatively short subdivisions, which in a practical case I make from one hundred and fifty to two hundred feet long, although they may be made as short as is desired. The length of these subdivisions or units is relatively unimportant, as will later appear, and the manner in which they are secured; but their provision in some form is an essential feature of my invention. In Figs. 1 and 2 I have illustrated a practical method of forming these subdivisions, which consists in insulating the rail A′ into subdivisions by insulating joints *c*. Within each of the subdivisions or units B′ B², etc., I provide means for acting upon a train at that point to positively control the speed thereof. The particular means for this purpose which I have illustrated in the drawings is merely an exemplary form of device. In my companion Patent, No. 809,894, application for which was filed contemporaneously herewith, I have illustrated another form of means within the subdivisions or units for positively controlling the speed of the train, including a train stop and certain devices by which it is released, and I have also described in said case an electrical apparatus for controlling the speed of the train positively by means within the successive track units. In the present case, I will set forth a form of apparatus, which apparatus approaches as nearly as desired to the ideally perfect system of train control, as above outlined, which in its broad aspects forms the subject of the present invention. It will, of course, be understood that the constructions illustrated are largely diagrammatic in this application on account of the impossibility of presenting all the mechanical features of a complete railroad system within the scope of a single patent.

D denotes a rail which is divided into subdivisions *d′ d² d³*, &c., corresponding to each of the track units B′ B² B³, &c. Each individual section is guided to move in a special way, which is particularly illustrated in Fig. 3. All of the sections are joined together at their ends, so as to constitute a practically continuous rail.

Referring to Fig. 3, I have shown a sample rail-subdivision, as *d³*, and at suitable points upon this rail are located studs 1 and 2, which project downwardly into guiding-slots 3 4 in cam-plates 5 and 6, secured to the ties in any convenient way. The cam-slot 3 is a straight inclined slot throughout its length, while the cam-slot 4 is inclined through the upper portion of its length, but has a terminal portion 4′, which is straight and parallel with the length of the track. In the drawings I have illustrated but two cam-plates 5 and 6; but inasmuch as the actual rail would be one hundred or two hundred feet long several would be employed in practice at positions indicated by dotted lines at 7, 8, and 9 of the drawings. In practice the incline of each cam-slot would be extremely small, since the rail has a longitudinal movement of many feet to carry it through a few inches of lateral throw. At each end of the controlling-rail is joined a short section *e*, which is illustrated in detail in Fig. 4, which is designed to permit a relative longitudinal movement between adjacent rail-subdivisions. For this purpose I have illustrated a form of telescoping or spliced connection *f*; but it is evident that the provision of this feature is within the skill of any mechanic, and a detailed description of any particular form is not required. The joining sections *e* of the controlling-rail have a very slight angular movement with respect to the rail-subdivisions proper, and for this purpose they may be pivoted thereto, as at *g*; but in practice the angular movement of the parts is so minute that the ordinary transverse elasticity of the rail will be amply sufficient to accommodate it.

From the above description it will be clear that each controlling-rail subdivision swings laterally when it is moved longitudinally, and by virtue of the relation of the cam-slots 3 and 4, each rail-subdivision takes a slightly-inclined relation after it has left the parallel position designated by the dot-and-dash line *h*. The amount of lateral throw of each controlling-rail subdivision is proportional to its longitudinal movement.

Coöperating with each controlling-rail subdivision I provide means for moving it longitudinally, and thereby securing a lateral throw.

*l¹ l² l³*, &c., indicate leads or connections from each insulated rail unit which run to magnets *m′*, *m²*, *m³*, &c., the circuit being completed through wires *n′ n²*, &c., to a ground-return *o*. Each of the rail units being charged from a line-wire *p* it is evident that the passage of a train at any point short-circuits each of the magnets *m′ m²* and causes the release of its armature.

In the drawings I have indicated a train K, which is positioned on both the track units B′ and B². The presence of this train is effective to deënergize magnets $m'$ and $m^2$, each of which releases its armature 10 in the manner indicated in Fig. 3 and opens the valve 11 of an air-cylinder 12 to a source of air-pressure at 13. The entrance of the air into the cylinder 12 pushes out a piston 14, connected to a lever 15, having a slotted section 16, which embraces the pin 1 previously referred to. The motion of the slotted lever 16 to the left moves the rail-subdivision $d^3$ in its cam-slots 3 4 into the position shown in Fig. 3 and in Fig. 1.

17 is a strong spring or any other equivalent pressure mechanism which exerts a constant tendency to return the slotted lever 15 as soon as the pressure is released in the cylinder 12. At this time the subdivision $d^4$ already occupies its extreme left-hand position by virtue of its deënergization when the train K entered the section B², and since the train has not wholly left this section the position of the parts still continues. The magnets $m^3$, $m^4$, $m^5$, &c., are all energized, and under their influence the rail-subdivisions $d^5$ $d^6$ $d^7$, which of course have been previously thrown to the extreme left-hand position, take certain new relations. As above stated, the sections $d^3$ and $d^4$ are fully thrown to their left-hand positions of extreme lateral throw by the deënergization of the magnets $m'$ and $m^2$. The magnet $m^3$ is, however, energized, so that pressure is released into a port 18 from the cylinder 12, and the lever 15 of the subdivision $d^5$ is free to swing to the right under the influence of its spring or pressure means 17. Such right-hand movement, is, however, limited by the intervening rail-section $e^5$, which has only a limited amount of telescoping extension. In like manner the section $d^6$ is limited in its return movement by the telescoping section $e^6$ and the subdivision $d^7$ by the telescoping section $e^7$. All of these sections are under a constant pressure of their pressure means 17 and move rearwardly as far as their telescoping extension will permit. The section $d^8$, which is, for example, a thousand feet behind the train K, is fully returned to its parallel relation with the track-rails represented by the dot-and-dash line $h$, and all the preceding sections back to a following train lie in this same straight parallel line, each of the telescoping extensions $e$ being slightly collapsed to permit this.

By virtue of the above it will be seen that every train causes to follow behind it a zone of influence represented by the controlling-rail D, which is deflected from its normal position a decreasingly great distance as the interval behind the train increases. As the train progresses additional controlling-rail subdivisions are thrown laterally, and each one holds the preceding against immediate return by a sort of chain or link action, so that the rail-subdivisions return gradually to their normally parallel relation, but each under the influence of its own power means. I regard this last feature as one of importance, since it avoids the movement of an excessive length of controlling-rail by a single application of power which would entail certain serious practical difficulties. Before referring to the method by which this traveling zone of variable influence is made to control the speed of a following train I will refer to a slight modification of the method by which it is secured.

Referring to Fig. 2 of the drawings, I have shown the track A divided into units B′, B², as before, each of which has a magnetic-controlled air-cylinder 12. Instead of employing a controlling-rail to secure the traveling zone of variable influence I use swinging guiding-cams Q′ Q² Q³, &c., which swing with the movement of their supporting-levers 15′ in a manner substantially similar to the movement of the levers 15, above referred to. 17′ designates spring or other pressure means by which the levers 15′ are returned to their normal position. In this form of the invention I make use of slotted links 19, which connect each of the levers 15′ with the preceding one, as clearly indicated in the figure. Under these circumstances it will be clear that when a train lies in the position corresponding to K in Fig. 1 magnets $m'$ and $m^2$ will be deënergized and the controlling-cams Q² and Q³ will be shifted to their extreme position of lateral movement. The cams Q⁴, Q⁵, and Q⁶ will be under a tension to move to their normal position under the influence of their pressure means 17′, but will be restrained in this movement by the links 19, which, however, allow each one to move a little more nearly to its normal position than the preceding. Accordingly the cam Q⁷ a considerable distance behind the train K will be fully restored to its normal position, and all the preceding controlling-cams will be likewise located up to a following train. Accordingly with this form of the device a series of controlling-cams is left behind each advancing train, whose degree of lateral movement decreases in proportion to the increasing interval behind the train. In this way is formed the traveling zone of variable influence corresponding to that referred to for the system of Fig. 1.

In all cases the "zone of variable influence" is a trackway condition governed by the condition of a given track section, *i. e.*, a device which may be termed an "influence member" is located adjacent to the trackway and its operative condition is governed by a track section. This influence member, when in operative condition, has a variable influence upon a passing train according to whether the speed of such train is above or below the predetermined permissive speed for that part of the trackway guarded by the influence member, as will be hereinafter explained. In the preferred form of the invention, more than one, or a succession of influence members, each influencing a different predetermined speed, are in operative condition at the same time, thereby coöperating with devices upon a car to effect different speeds of such car at different portions of the trackway. I will now refer to a form of controlled apparatus upon each train which serves to govern the speed thereof.

Referring particularly to Figs. 5 and 6, 20 indicates a vertical shaft supported by a train, and preferably by only the forward car thereof, for a reason which will later appear. Upon this shaft is mounted a crank-arm 21, carrying a fork or projection 22. The fork or projection 22 is adapted to embrace the controlling-rail D or to enter the cam-guides Q, which may be located on a different part of the same railway, if desired. With the controlling-cams Q however, it would be more practical to use a stud or roller at the end of the arm 21. Whichever movement is used the arm 21, with its shaft 20, is swung angularly by the controlling-rail D or the laterally-moving cams Q, and the amount of angular throw depends upon the positions of said rail or cams. 23 indicates a segment-gear upon the swinging shaft 20, meshing with the pinion 24 upon a sleeve 25. 26 indicates an ordinary centrifugal speed-governor which is geared to the axle of the train, so that a part or collar 27 has a position which varies as the speed of the train varies. I connect this part or collar 27 with a shaft 28 by means of a segment-gear 29 and a pinion 30. These particular features are of course merely a single form of practical embodiment of the invention. It is merely essential to provide one part which is moved by the traveling zone of variable influence of a preceding train and another part which accords its motion to the absolute speed of the train on which it is mounted and to arrange an automatic control which will reduce or increase such train speed according to the relative position of such parts. In order to make the invention complete, I have indicated a simple form of accomplishing this, although in practice a more elaborate apparatus would probably be used. It is to be understood that these detail features are merely to render the specification complete in showing an operative system throughout, but that what I regard as my real invention consists in the traveling zone of variable influence and in the means, broadly stated, by which it is effective to control a following train.

Referring to Fig. 6, 31 indicates a disk upon the sleeve 25, and 32 is a hand or contact blade which moves with the spindle 28. The disk 31 takes its angular position in accordance with the position of the train in the traveling zone of variable influence of a preceding train, while the contact-blade 32 takes its position from the speed-governor 26, and therefore accords with the absolute speed of the train. Thus the disk 31 may be termed an "influence responsive device," because its position depends upon the condition of the influence member, such as the rail or cam with which it contacts, and that condition of the influence device is governed by the condition of a track section ahead; and the governor 26 may be termed a "speed responsive device" because its condition depends upon the speed of the car carrying it. Accordingly a pointer 31′ upon the disk 31 indicates upon a stationary dial 33 just what part of the traveling zone of variable influence of a preceding train that the train under consideration occupies, while the pointer 32 indicates on the stationary dial 33 the actual speed that the train under consideration has at that time. These indications would be exceedingly valuable to the engineer who could manipulate his controller to accord the two speeds; but I prefer to make the control automatic, and for this purpose I locate three electrical contact-plates 34, 35, and 36 upon the disk 31, with which the contact-blade 32 makes contact under certain conditions. In the position indicated in Fig. 6 of the drawings the disk happens to be set by the traveling zone of variable influence of a preceding train to a value of ten miles per hour. It also happens that the contact-blade 32 is located at ten-miles-per-hour value, which means that the speed of the train should be ten miles per hour and is ten miles per hour, so that everything is all right. Under these circumstances the contact-blade 32 makes no electrical connection whatever. By the resistance of friction the speed of the train is likely to presently fall below ten miles per hour, at which time the contact-blade 32 makes electrical contact with the plate 34 and operates the controller to turn on more power. As the speed accelerates the blade 32 swings back again, and should it happen that too much speed were attained a contact would be made at 35, which would in any convenient way, which need not be described, apply the service-brake. Should it happen that the train passed rather suddenly into the traveling zone of variable influence of a preceding train or on account of slippery rails or a downgrade or other reason the speed of the following train failed to be sufficiently reduced by a service application of the brakes, then it might happen that the blade 32 would be located over the plate 36, which would serve to apply the emergency-brakes and stop the car under any circumstances. When the train is running along normally and out of range of the traveling zone of influence of a preceding train, the blade 32 lies constantly on the power-plate 34, which permits the train to attain its highest speed; but of course an independent controller may be always manipulated to cut down this speed for stopping at stations or for any other purpose at the pleasure of the engineer. I have designated this independent controller as a simple switch in Fig. 7, and it is evident that when the train is proceeding normally this switch will be closed, so that the operating or pilot circuit will be wholly under the control of the automatic devices. In this condition the operating-circuit is adapted to be closed by the blade 32 passing onto the contact-plate 34, which serves to apply power through the usual contactors. This is the normal condition when the train is proceeding regularly along the track, it being evident that a constant application of power is necessary to overcome the friction and other resistance. If the train passes into the zone of influence of the preceding train, the operating-circuit is automatically broken by the movement of the blade 32 away from the plate 34. If the train is approaching a station, the operating-circuit is opened at the usual controller, (shown as a simple switch in Fig. 7), so that the train is stopped in this way. Thus the train is under the control of the engineer, as well as the automatic mechanism.

It will be seen that when a given "influence member" is in operative condition its influence is variable; first, in that it is without effect if the speed of the passing car is below the predetermined permissive speed controlled by such device, and is only effective to reduce the speed to the predetermined speed if the passing car is above the permissive speed; and, second, in that a succession of influence members for different predetermined permissive speeds effects a still further variation in that the character of the zone is different from one part to another. It is therefore to be understood that unless otherwise stated, I use the term "zone of variable influence" herein as referring to the first of the above definitions.

In practice I make the track units about two hundred feet long and arrange the system so that the limits of the traveling zone of variable influence is about eight hundred or one thousand feet behind the train. A following train can run at any speed whatever until it arrives at this traveling zone of variable influence. The trains at this time are, however, about eight hundred or one thousand feet apart, which is sufficient for the stoppage of the rear train without collision at any ordinary practical speed of the latter. At this time the automatic controlled parts on the rear train come into action and reduce the speed of the train; but such automatic means permit the train to move farther into the traveling zone of variable influence as its speed is cut down. In practice I would arrange the device so that when the speed had been cut down by half the following train could move three-quarters of the way into the traveling zone of variable influence without causing the train-controlling means to set the service-brakes. On downgrades I make the track units slightly longer, since it is dangerous to run trains so closely together on downgrades, and on upgrades the units might be made quite small, because the stoppage of a train can be readily accomplished within a short distance under these circumstances. Supposing that a railroad is equipped with a system as above described and the trains were allowed to be wholly controlled by the automatic devices, the action would be substantially as follows: An initial train would be started down the track, and inasmuch as it could run into no traveling zone of variable influence of a train ahead the train would operate at its top speed of thirty-five or forty miles per hour throughout the whole distance. A second train despatched a thousand feet behind the first would not catch up with the first, but would also travel at its top speed; likewise the third and fourth, and so on, all the trains moving at their top speed. Now imagine any train—as, for example, train No. 1—stopping or slowing down. Train No. 2 would at once come into the traveling zone of variable influence of train No. 1, and, supposing train No. 1 was moving at half its former speed, train No. 2 would take on a corresponding speed and would be separated from train No. 1 by an interval one-quarter as great as previously. Likewise train No. 3 would eventually come to half-speed at a distance one-quarter its previous interval from train No. 2; but by virtue of this diminishing interval in each case it will be seen that when a train slows down the two or three following trains bunch up more closely together and make room for the trains still farther back. By the time that one or two trains have so bunched up together a considerable interval of time has elapsed and train No. 1 has probably resumed its full speed. It will be found that each train can work at as high a speed as it can attain, making necessary stops, the stoppages of the different trains averaging up by a sort of elastic movement which compensates itself for the stoppages of different trains at different times as actually occurs in practice. In other words, the highest limit of speed in making the entire journey is the time it would take a train to run the entire route making all necessary stops and attaining its utmost capacity of speed between stations. Such a transit speed can only be attained at present when trains are separated by at least two or three block intervals apart, which corresponds to half a mile or more. With the system here set forth this utmost transit speed corresponding to the utmost capacity of any single train can be maintained no matter how closely the trains approach the minimum safe distance of separation which corresponds to the interval required to stop any following train at its particular speed. Expressed in still a different way, the system secures the utmost possible limit of train frequency for a required speed in a railroad installation.

In practice trains are of different lengths, some having only two or three cars, while others have as many as eight cars in a train. The arrangement of the present invention works perfectly for all lengths of trains, since as many controlling-magnets will be deënergized as the train overlaps units, so that the traveling zone of variable influence extends rearwardly from the last car. Inasmuch as the automatic controller of each train is located only on the forward car, it is the position of the front of the rear train with relation to the rear of the forward train that governs the system.

What I claim is:

1. In a railroad system, a plurality of trains each having a traveling zone of variable influence extending from the rear car thereof, and means governed by said zone of variable influence for controlling the speed of a following train.

2. In a railroad system, a plurality of trains each having a traveling zone of variable influence extending from the rear car thereof, and means governed by said zone of variable influence for controlling the speed of a following train, said system comprising a sectioned trackway, the sections of which are governed by one of said trains when passing therethrough, the said zone comprising an influence member associated with the trackway and governed by a section of said trackway, and the said means being carried by said following train and comprising a speed responsive device governed by the speed of said following train, an influence responsive device governed by said influence member, and means controlled by the joint action of the speed responsive and influence responsive devices for controlling the speed of the train.

3. In a railroad system, means whereby each train produces a zone of variable influence in the rear thereof, and means upon a following train for governing its speed in proportion to its entrance into said zone of influence, said system comprising a sectioned trackway, the sections of which are governed by one of said trains when passing therethrough, the said first-named means comprising a plurality of influence members associated with the trackway and governed by said track sectioned trackway in such manner as to cause a plurality of said members to assume different influence conditions at the same time, and the said last-named means comprising a speed responsive device governed by the speed of said following train, an influence responsive device governed by each of said influence members, and means controlled by the joint action of the speed responsive and influence responsive device for controlling the speed of the following train.

4. In a railroad system, means whereby each train produces a zone of variable influence in the rear thereof, and means upon a following train for governing its speed in proportion to its entrance into said zone of influence, said system comprising a sectioned trackway, the sections of which are governed by one of said trains when passing therethrough, the said first-named means comprising a series of influence members associated with the trackway and governed thereby in such manner as to have their condition altered successively in accordance with successive changing track section conditions, and the said last-named means comprising a speed responsive device governed by the speed of said following train, an influence responsive device governed by each of said influence members, and means controlled by the joint action of said speed responsive and influence responsive devices for controlling the speed of the following train.

5. In a railroad system, a track divided into units, train-controlling means at each unit, and means whereby a preceding train sets such controlling means at different conditions in the rear thereof so as to control the speed of a following train, said train controlling means comprising track magnets adapted to be deënergized by a passing train and also comprising an auxiliary source of energy and apparatus controlled by the respective magnets to apply the said energy to modify the condition of the said controlling means associated therewith, and also to modify differently the condition of the controlling means associated with another track unit, and the said means for setting the controlling means to control the speed of a following train including a speed responsive device carried by the said following train and braking means controlled jointly by said speed responsive device and by said train controlling means.

6. In a railroad system, a track divided into units, train-controlling means at each unit, means whereby a preceding train displaces such train-controlling means at its rear, and controlled parts on a following train for automatically governing its speed.

7. In a railroad system, a track divided into units, train-controlling devices at each unit arranged to be variably displaced by a passing train, and controlled means on a following train for automatically governing its speed arranged to be engaged by said controlling means.

8. In a railroad system, a plurality of train-controlling devices arranged at intervals along the track, means on each train for displacing such devices variable distances diminishing in proportion to their distance from the rear of the train, and means on a following train for governing its speed controlled by said devices.

9. In a railroad system, a plurality of trains each having means thereon for producing a traveling zone of variable influence in the rear of the train, said influence being less in proportion to its distance from the rear of the train, and means whereby the speed of a succeeding train is automatically governed according to its amount of penetration into such zone.

10. In a railroad system, a track divided into units, a mechanical device at each unit arranged to have a lateral movement, means on each train for governing its speed in proportion to such lateral movement, and means on each preceding train for setting such devices to varying degrees of lateral movement.

11. In a railroad system, a track divided into units, a mechanical device at each unit arranged to have a lateral movement, means on each train for governing its speed in proportion to such lateral movement, and means on each preceding train for setting such devices to varying degrees of lateral movement an amount inversely proportional to their distance from the train.

12. In a railroad system, a track divided into units, a device at each unit arranged to be displaced by the movement of a train a distance inversely proportional to the distance of the rear of the train, and means located at the front end of the following train and acted on by such devices for governing its speed.

13. In a railroad system, a track divided into units, means set in operation by a train for creating a traveling zone of variable influence behind such train, and means on a following train for governing its speed in proportion to its entrance into such zone of influence, the said first-named means comprising a series of influence members associated with the track and each having its condition altered in a plurality of successive stages in accordance with the condition of the successive track units, and the said last-named means being carried by the following train and comprising a speed responsive device governed by the speed of said following train and an influence responsive device governed by said influence members, and braking means controlled jointly by said speed responsive and influence responsive devices.

14. In a railroad system, a track divided into units, means set in operation by a train for creating a traveling zone of variable influence behind such train, and means on a following train for governing its speed in proportion to its entrance into such zone of influence, the said first named means comprising a series of influence members associated with the track and having their condition altered in a plurality of stages successively in accordance with the condition of the successive track units, and the said last-named means being carried by the following train and comprising a speed responsive device governed by the speed of said following train and an influence responsive device governed by said influence members and a preparatory device, a service brake valve and an emergency brake valve adapted to be successively operated by the joint action of the said speed responsive and influence responsive devices.

15. In a railroad system, a track divided into units, connections from each unit for displacing a mechanical device arranged to govern the speed of a following train, and means whereby such device displaces following devices to a successively less distance than its own displacement.

16. In a railroad system, means for governing the speed of a train in proportion to its distance from a preceding train, the said system comprising a series of track sections and a series of influence members, each governed by one of the successive track sections, and the said means being carried by the said train and comprising (*a*) a speed responsive device governed by the speed of said train, (*b*) an influence responsive device governed by the respective influence members, and (*c*) means controlled by the joint action of said speed responsive and influence responsive devices for controlling the speed of the said train.

17. In a railroad system, means for governing the speed of a train in proportion to its distance from a preceding train, the said system comprising a series of track sections and a series of influence members, each governed by one of the successive track sections, and the said means being carried by the said train and comprising (*a*) a speed responsive device governed by the speed of said train, (*b*) an influence responsive device governed by the respective influence members, (*c*) means controlled by the joint action of said speed responsive and influence responsive devices for controlling the speed of the said train, and (*d*) means for manually controlling the speed of the train when said speed responsive and influence responsive devices are not conjointly acting.

18. In a railroad system, a track divided into units, train controlling means at each unit, adapted to have its condition changed by a passing train, and parts on a following train adapted to be affected by said train controlling means, said parts comprising a speed responsive device governed by the speed of the following train, and an influence responsive device governed by said train controlling means and braking means controlled jointly by the speed responsive and the influence responsive devices.

19. In combination, a track, a car thereon, a safety appliance for excessive speed on the car, a speed responsive device on the car, a movable member on the car, means partly on the car and partly on the track to initiate movement of said member and to continue its movement in correspondence with the progress of the car along the track, and means actuated through a certain range by said device and said member conjointly and adapted on the attainment of a certain stage of such range to actuate said safety appliance.

20. In combination, a track, a car thereon, a safety appliance for excessive speed on the car, two members on the car adapted conjointly to actuate said appliance, a speed responsive device connected to actuate one member, means partly on the car and partly on the track adapted initially to actuate the other member and thereafter further to actuate it in correspondence with the progress of the car along the track, said means being normally inoperative, the foregoing apparatus comprising parts capable of a certain range of ineffective change of relationship and effective only after such range has been accomplished.

21. In combination, a track, a car thereon, a safety appliance for excessive speed on the car, a speed responsive device on the car, means operative conjointly with said device idly over a range and thereafter effectively to actuate said appliance, means partly on the track to initiate the operation of said first-mentioned means and to continue its operation in correspondence with the progress of the car along the track.

22. In a railroad system, a train having means thereon by which its speed its automatically controlled to accord with the position of a controlling device actuated by a preceding train.

23. In a railroad system, devices along the track displaced at varying distances from a normal position, and means upon a train for governing its speed controlled by the position of such devices.

24. In a railroad system, a rail divided into subdivisions, means for displacing such subdivisions laterally to a varying distance proportioned to the distance from a preceding train, and means upon a following train for governing its speed controlled by the position of such subdivisions.

25. In a railroad system, a track divided into units, a rail divided into subdivisions corresponding to said units and laterally displaceable by a train, and an arm on each train guided by said rail arranged to govern its speed.

26. In a railroad system, a plurality of displaceable devices arranged along the roadway, an arm on each train arranged to be displaced by such devices, a part on each train mounted to be moved in proportion to the speed of the train, and means whereby such speed is made to automatically accord with the movement of said arm.

27. In a railroad system, a plurality of devices disposed at intervals along the track and arranged to be moved laterally by the passage of a train, an arm upon a succeeding train mounted to be displaced by such devices, and means whereby the speed of such following train is automatically made to accord with the movement of said arm.

28. In a railroad system, a plurality of devices which are displaced by the passage of a train diminishing distances in proportion to their distance from the train, and means whereby the speed of a following train is automatically reduced by such devices provided it exceeds a predetermined amount corresponding to its interval from the preceding train.

29. In a railroad system, a rail having laterally displaceable subdivisions extending the entire length of the track, telescoping extensions for each subdivision, means actuated by a passing train for displacing a subdivision laterally, and means whereby such displacement prevents the complete return movement of the following subdivision.

30. In a railroad system, a rail divided into subdivisions which are laterally displaceable, means on each train for displacing a subdivision to its extreme limit of movement, and means whereby such movement is effective to prevent the complete return of the preceding subdivisions, whereby a traveling zone of variable and decreasing influence is created in the rear of each train for the purpose of governing the speed of a following train.

31. In a railroad system, a rail divided into subdivisions each of which is longitudinally and slightly laterally movable, telescoping extensions on each subdivision whereby the preceding subdivision is permitted a slightly less degree of movement, and fluid pressure means controlled by the passage of a train for successively throwing the subdivisions to their limit of movement.

32. In a railroad system, a rail having a plurality of subdivisions each of which is guided to move forwardly and slightly laterally, means for moving a subdivision by the passage of a train, and means whereby such subdivision permits the partial but not complete return of the preceding subdivisions to their normal position.

In witness whereof, I subscribe my signature in the presence of two witnesses.

HANNIBAL C. FORD.

Witnesses:

THEO. D. WALKER,

A. MERHILL.

Copies of this patent may be obtained for five cents each, by addressing the "Commissioner of Patents, Washington, D. C."